April 6, 1965    A. ST. J. BOWIE    3,176,777
ELEVATIONAL CONTROL MECHANISM FOR AN IMPLEMENT CARRIER
Filed May 8, 1962    5 Sheets-Sheet 1
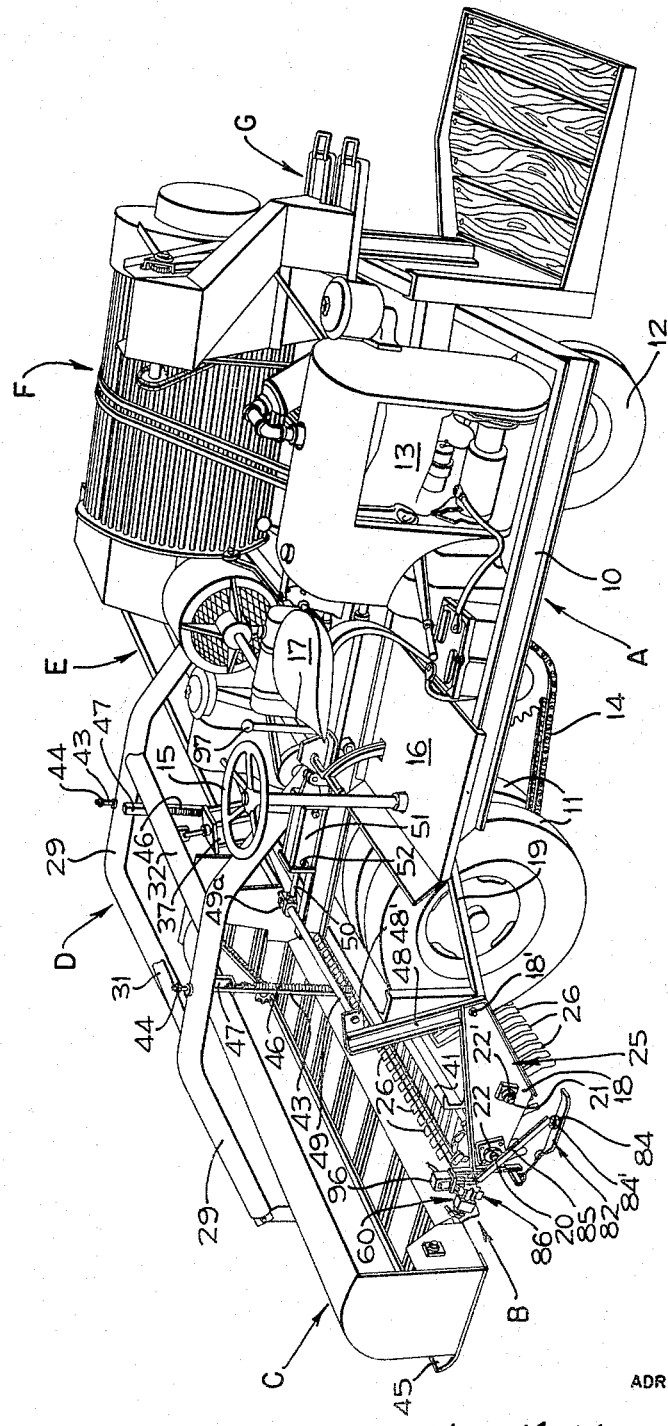
FIG_1
INVENTOR
ADRIAN ST. J. BOWIE
BY Hans G. Hoffmeister
ATTORNEY

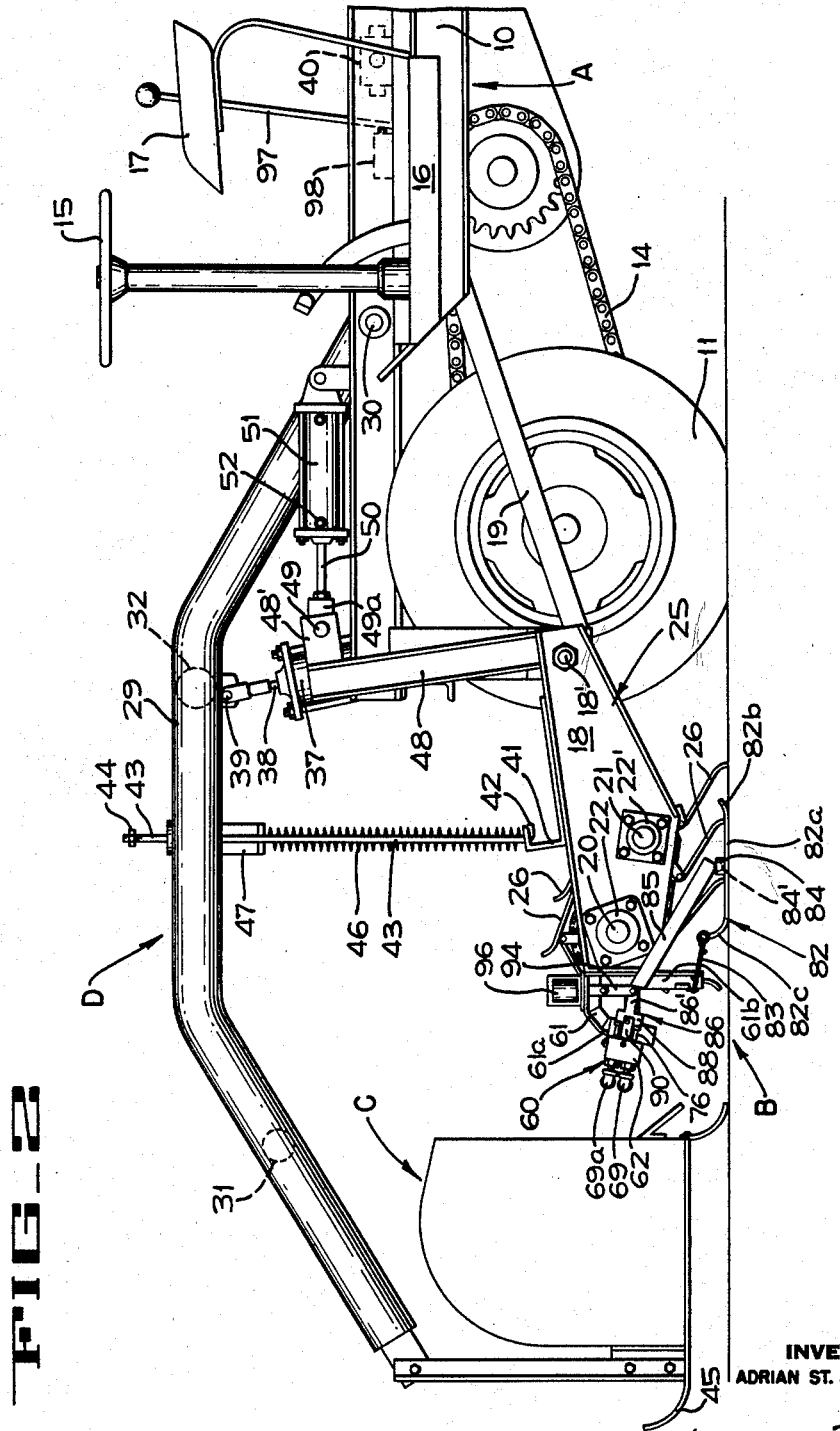

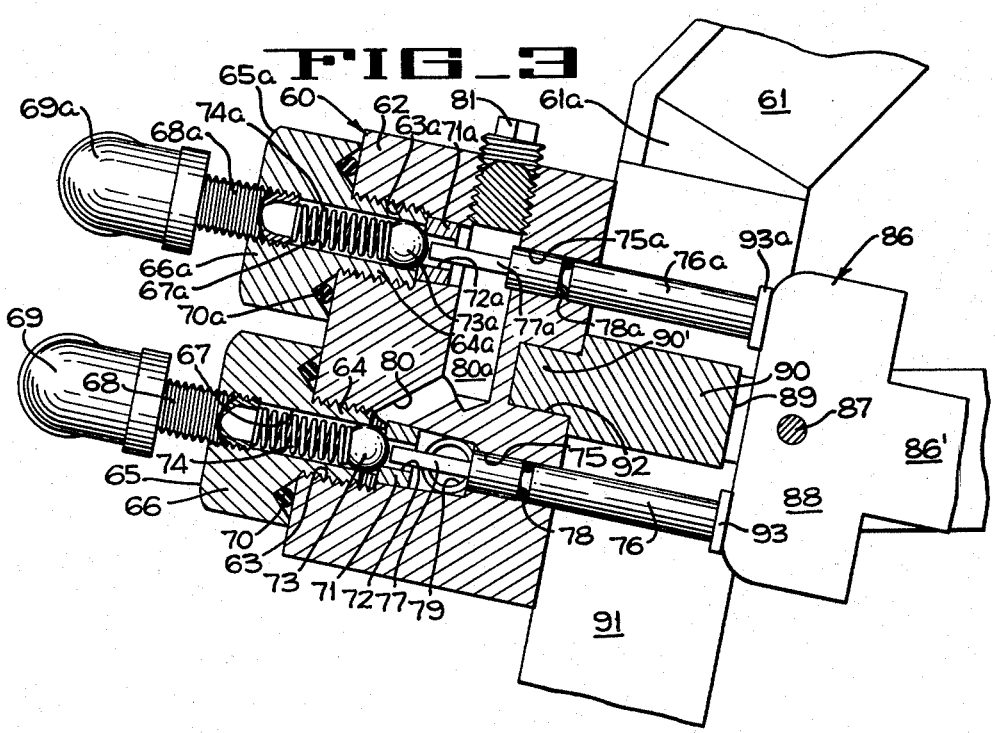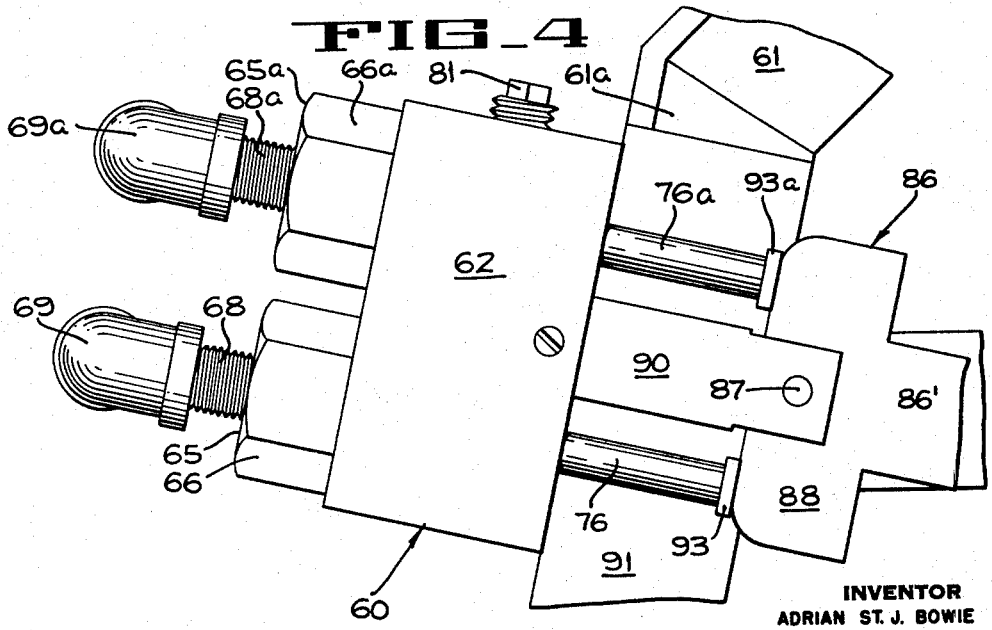

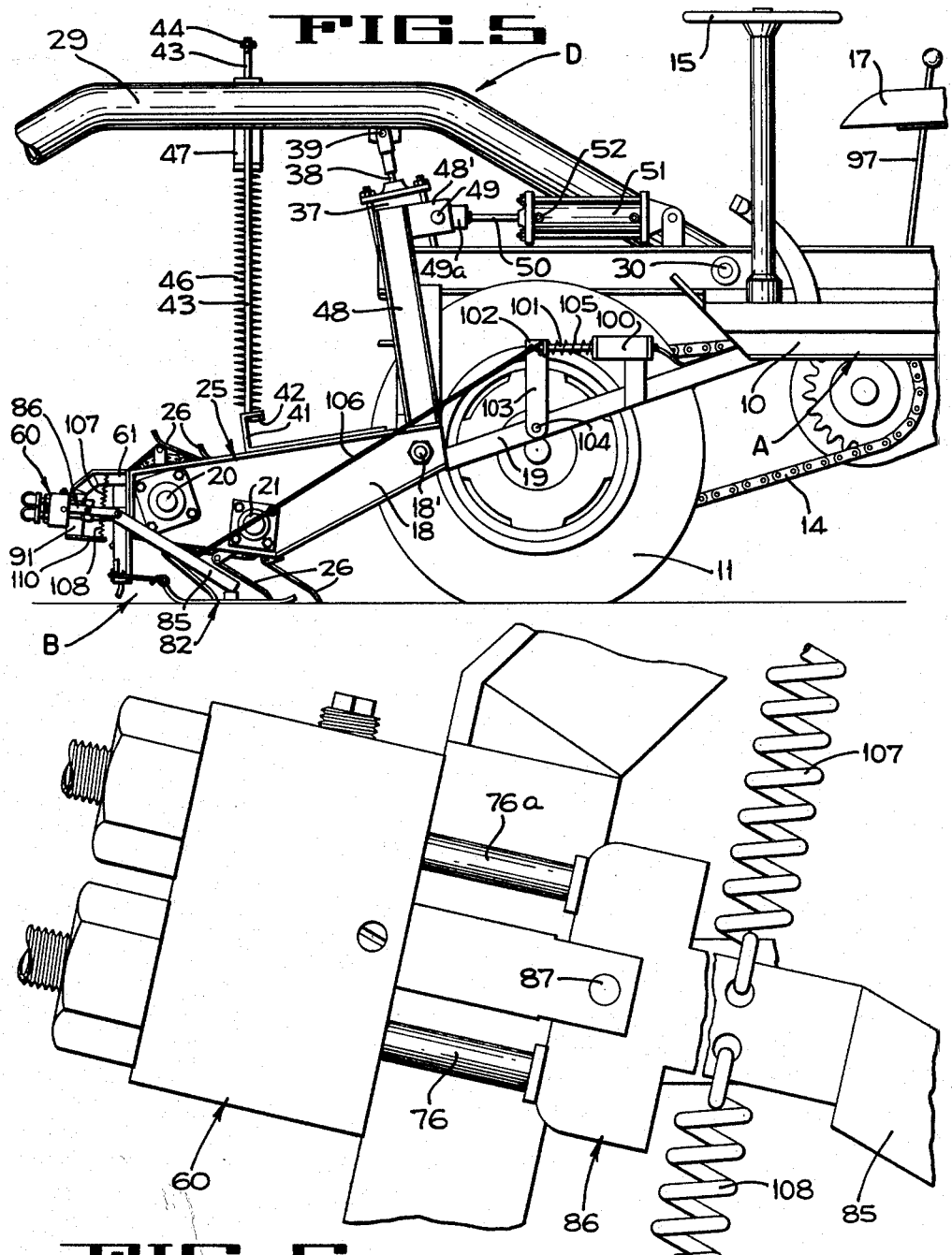

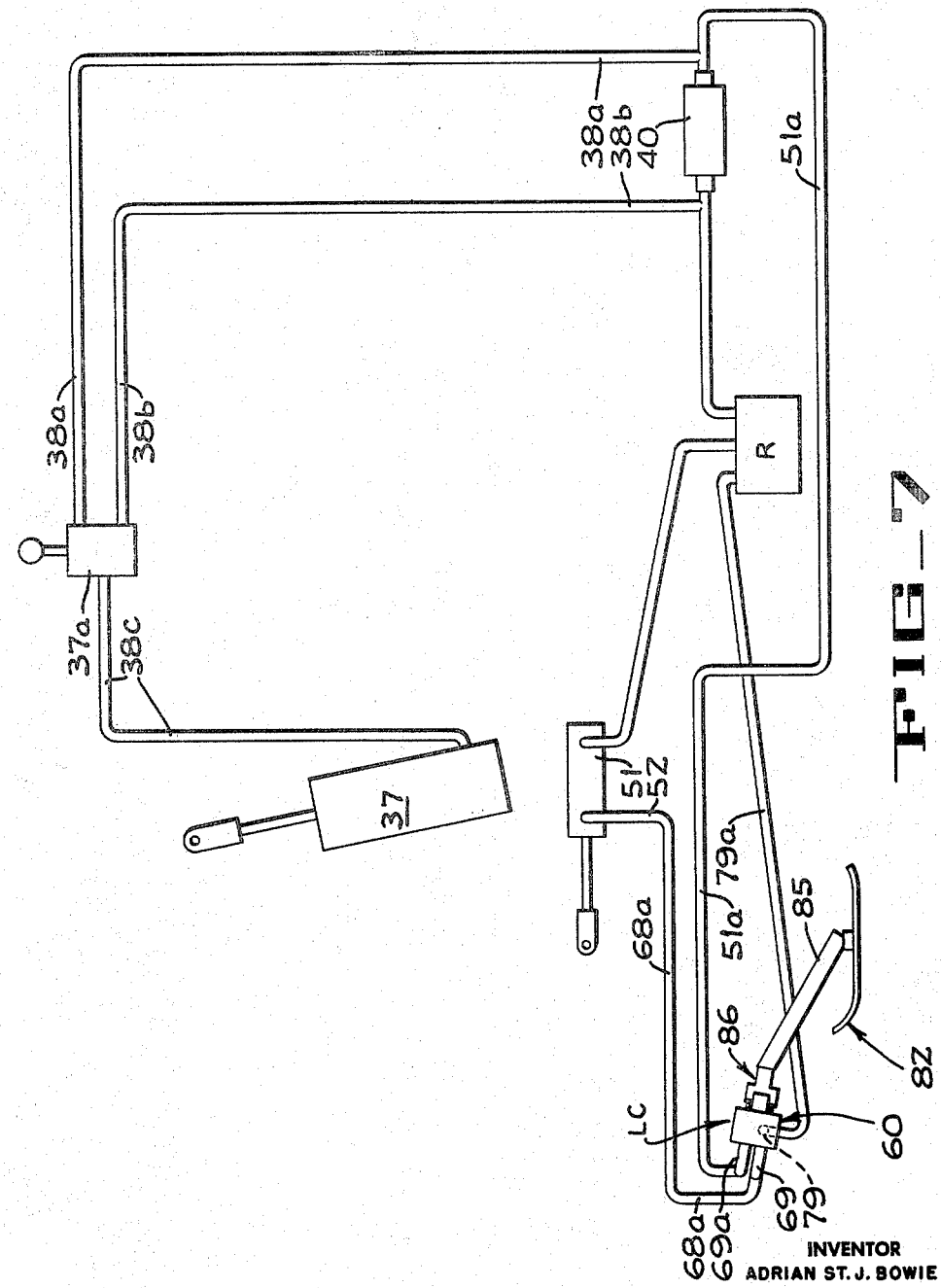

United States Patent Office

3,176,777
Patented Apr. 6, 1965

3,176,777
ELEVATIONAL CONTROL MECHANISM FOR AN IMPLEMENT CARRIER
Adrian St. J. Bowie, San Jose, Calif., assignor to FMC Corporation, San Jose, Calif., a corporation of Delaware
Filed May 8, 1962, Ser. No. 193,126
4 Claims. (Cl. 172—4)

The present invention pertains to an elevational control mechanism and, more particularly, to such a mechanism which maintains an implement carrier in a work position in predetermined spaced relation to the ground during forward earth traversing movement of the machine over uneven terrain and which is automatically operable to raise the carrier out of work position during rearward travel of the machine.

It has been known in the past to control the height of earth working tools, harvesting devices, and the like, during movement of an agricultural machine, and the like, over uneven ground. Many of these known control mechanisms have not been satisfactory under all operating conditions as, for example, during both forward and rearward travel of the machine and during travel of the machine over minor obstructions or surface irregularities as opposed to significant changes in the surface contour. The subject control mechanism overcomes many of the deficiencies in the prior art mechanisms and offers improved operating characteristics.

Accordingly, it is an object of the present invention to provide an improved elevational control mechanism for an implement carrier.

Another object is to provide an elevational control mechanism which maintains an implement carrier in desired work position in predetermined spaced relation to the ground during forward travel of the carrier over uneven terrain and which automatically raises the carrier out of said work position during rearward travel thereof.

Another object is to provide an elevational control mechanism which operates in response to significant changes in the contour of earth traversed and which resists operation when traversing minor surface irregularities or encountering minor obstructions.

These and other objects and advantages of the present invention will become apparent from the following description thereof, taken in conjunction with the accompanying drawings, in which:

FIG. 1 is a perspective view of a nut harvesting machine incorporating the elevational control mechanism of the present invention.

FIG. 2 is a fragmentary, enlarged side elevation of the machine and control mechanism of FIG. 1.

FIG. 3 in a fragmentary, still further enlarged longitudinal vertical section of a portion of the control mechanism shown in FIG. 2 and of the portion of the harvesting machine on which it is mounted.

FIG. 4 is a side elevation of the mechanism illustrated in FIG. 3.

FIG. 5 is a view which is similar to FIG. 2, although omitting front and rear portions of the harvesting machine shown in FIG. 2, and which illustrates a modified form of the subject control mechanism.

FIG. 6 is a view which is similar to FIG. 4 and which illustrates a side elevation of the control mechanism shown in FIG. 5.

FIG. 7 is a schematic diagram of the hydraulic circuit used in the control mechanism of the present invention.

Although the control mechanism of the present invention is useful for various implement carriers, it is conveniently described for use on a nut harvesting machine of the type disclosed in U.S. Patent No. 2,780,904 to Bowie et al. With particular reference to FIGS. 1 and 2 herein, this harvesting machine includes a vehicle A; a nut gathering mechanism B; a nut conveying mechanism C adapted to receive the nuts from said gathering mechanism; a hoisting mechanism D for raising and lowering said gathering and conveying mechanisms; a conveyor E for elevating nuts from conveying mechanism C to a nut cleaning and screening mechanism F; and a nut discharging mechanism G. Inasmuch as the present invention is concerned with elevationally controlling the gathering mechanism B, various details of the harvesting machine, which are fully disclosed in said Bowie patent will not be described herein, except to an extent believed necessary for a better understanding of the present invention.

Thus, the vehicle A comprises a frame 10 supported in conventional manner upon four front wheels 11 (only two being shown) and two rear wheels 12 (only one of which is shown). Operably mounted upon the vehicle frame 10 adjacent the rear end thereof is an engine 13. The engine 13 is connected to drive the front wheels through a conventional transmission and a drive chain 14. The rear wheels 12 are connected in any well known manner to a steering wheel 15 located at the left-hand side of the vehicle frame 10 and forward of the engine 13. A foot platform 16 and a seat 17 are mounted on the frame 10 for convenience of the operator.

The nut gathering mechanism B is mounted on the frame 10 by a pair of swing frame members 18, only one frame member 18 being shown, located respectively at opposite sides of said frame. Each of the members 18 has a rear end pivotally connected by a hinge bolt 18' to the forward end of a side element 19 of the frame 10. Individual mounting of the swing frame members 18 in the manner just described permits some degree of pivotal movement thereof with respect to one another.

The swing frame members 18 support therebetween a pair of horizontally extending shafts 20 and 21 journalled in bearings 22 and 22', respectively, carried by each swing frame member 18. The frame members 18 and the shafts 20 and 21 constitute a carrier 25 for nut picking fingers 26 which gather nuts from the ground and flip them into the conveying mechanism C.

The nut conveying mechanism C is supported by the hoisting mechanism D, the latter including a pair of lift arms 29 pivoted at 30 and interconnected by cross bars 31 and 32. The lift arms are raised and lowered by a hydraulic cylinder 37 which is pivotally mounted upon the forward end of the frame 10. A piston rod 38 which is reciprocably mounted within the cylinder 37 is pivotally connected at its upper end 39 to the cross bar 32. The hydraulic cylinder 37 is actuated by a manually controlled valve 37a (FIG.7), which valve connects the cylinder by means of conduits 38a, 38b and 38c with either the suction or the discharge side of a pump 40 (FIG. 2) mounted on the frame 10 and operated by the engine 13. The conveyor mechanism C is thus elevated by manual control to clear ground rises and obstructions when the harvesting machine is being driven to and from an orchard, for example.

The swing frame members 18 are connected at their upper edges to a transversely extending channel member 41. The upper flange of the member 41 is perforated to receive the lower hooked ends 42 of a pair of transversely spaced generally vertical lift rods 43. The upper end of each of the rods 43 extends through a suitable aperture in a respective lift arm 29, and projects a predetermined distance above the arm. At its upper end, each of the rods 43 is threaded and receives a limit nut 44. With this arrangement, the lift arms 29 first elevate the conveying mechanism C a short distance independently of the gathering mechanism B, and then elevate the mechanisms together. The limited independent mounting of the nut conveying mechanism C enables the latter to clear ground rises and obstructions without changing the elevation of the nut gathering mechanism B above the ground. A pair of skids 45 (only one being shown), further aid the mechanism C to clear obstructions. Further, simultaneous elevation of the conveying and gathering mechanisms facilitates movement of the harvesting machine from one orchard to another.

The weight of the gathering mechanism B is supported by a helical tension spring 46 mounted adjacent each rod 43, the spring being hooked at its lower end to the upper flange of the channel member 41 and at its upper end to a bracket 47 carried by the associated lift arm 29.

With the foregoing description of the harvesting machine as environmental background, the control mechanism of the present invention is now described. This control mechanism provides fluid operated means for automatically raising and lowering each of the swing frame members 18 independently of the conveying mechanism C and in response to changes in the contour of the ground over which the harvesting machine travels. Only the elevational control LC (FIG. 7) for the left-hand swing frame member 18, that is on the left of an operator sitting on the seat 17 and facing forward, is described. Thus, a lever 48 is upwardly extended from the member 18 adjacent its rearward end. The upper end of the lever 48 has a projection 48' connected to the outer end of a horizontally disposed rod 49 which extends transversely of the vehicle A.

Intermediate its length, the rod 49 is connected by a link 49a (FIG. 1) to the outer end of a piston rod 50 which is reciprocably mounted within a cylinder 51 supported by the frame 10. As will be apparent, the piston rod 50 is operable to exert a pull toward the right, as viewed in FIG. 2, upon the rod 49, which rod will then exert a pull in the same direction on the upper end of the lever 48 so as to pivot the associated swing frame member 18 in a clockwise direction around the respective hinge bolt 18' and raise the gathering mechanism B. When the pressure within the cylinder 51 is relieved, the gathering mechanism B moves by gravity to a lower position.

The cylinder 51 is provided with a port 52 that is hydraulically connected through a control valve 60 (FIGS. 2, 3 and 4) to a pressure line 51a (FIG. 7) which communicates with the pump 40. The valve 60 is supported on the forward leg 61a of a frame member 61 whose rear vertical leg 61b (FIG. 2) is secured to the forward edge of the swing frame member 18. The valve 60 (FIG. 3) comprises a valve housing 62 of generally rectangular cross section having lower and upper spaced parallel bores 63 and 63a extending longitudinally therethrough. The lower bore 63 has an internally tapped outer socket that receives a threaded shank 64 of a valve fitting 65, said fitting having an hexagonal head portion 66. The fitting 65 has an axial bore 67 in coaxial communication with the bore 63, said bore 67 having an outer internally tapped socket that receives a threaded nipple 68. The nipple 68 has an outer end connected to a pipe elbow 69 that, in turn, is connected by a conduit 68a to the port 52 of the cylinder 51. The fitting 65 carries an O-ring 70 for sealing against the adjacent surface of the valve housing 62. The bore 63 has an inner tapered portion that receives a tapered valve seat member 71 having a port 72 extending therethrough. A ball valve member 73 is seated on member 71 and is yieldably urged into a position closing the port 72 by a compression spring 74 which has opposite ends bearing against the ball 73 and the inner end of the nipple 68. The valve housing provides lower and upper spaced parallel bores 75 and 75a, the lower bore 75 being in coaxial communication with the inner portion of the bore 63. Further, the bore 75 slidably receives a valve actuator shaft 76 having an inner axially extending pin 77 that projects into the port 72 of the valve seat member 71 for engagement with the ball valve member. An O-ring 78 on the shaft 76 prevents leakage between the shaft 76 and the bore 75. One of the side walls of the valve body 62 has a drainage outlet 79 that is in communication with the inner end of the bore 63 and is also connected to a reservoir, not shown, which connects to the suction side of the pump 40.

As is best seen in FIG. 3, the numbers 64a through 78a identify valve structure associated with the upper bore 63a corresponding to that just described in regard to the lower bore 63. It is to be noted, however, that the valve body 62 does not provide a drainage outlet for the bore 63a.

The valve body 62 does provide a passageway 80 connecting the bore 63 with the inner end of a larger diameter passageway 80a in the valve body. The passageway 80a intersects and communicates with the bore 63a and has an outer end into which is threaded a plug 81. The pipe fitting 69a threaded upon the outer end of the nipple 68a is connected to the discharge side of the pump 40 thereby completing the hydraulic series circuit of the pump, the cylinder 51, and the valve 60.

The valve 60 is operated in response to changes in the contour of the ground over which the vehicle A is driven. For this purpose, a runner 82 (FIGS. 1 and 2) is provided and has a flat intermediate ground engaging portion 82a, an upturned rear end 82b, and an upturned front end 82c connected to the lower end of the vertical leg 61b by a flexible wire 83. A receptacle 84 is mounted on the upper surface of the ground engaging portion and rotatably captures ball 84'. A follower arm 85 has a lower end rigidly secured to the ball 84' and an upper end rigidly secured to a central extension 86' (FIGS. 2 and 3) of a T-shaped actuator 86. A horizontal pin 87 (FIGS. 3 and 4) passes through a cross bar or head 88 of the actuator 86 and is journalled in a longitudinally extending cylindrical arm 90 which is provided with a slot 89 to receive the head 88; it is to be noted that the pin 87 is substantially normal to the path of travel of the vehicle A. The arm 90 is mounted, as by welding, on a flange 91 which projects down from the forward leg 61a of the frame member 61. The arm 90 has an upper reduced cylindrical extension 90' (FIG. 3) that is received in a bore 92 in the inner wall of the valve housing 62 for supporting the valve on the frame member 61 and, as is believed understood, on the carrier 25 (FIG. 2) for the fingers 26. As is most clearly illustrated in FIGS. 3 and 4, the cross bar 88 of the follower arm actuator 86 is positioned for contact with the heads 93 and 93a carried at the outer ends of the actuator shafts 76 and 76a, respectively.

The valve 60 is operated by the follower arm 85 and its actuator 86 when said actuator pivots or rocks on the pin 87 in response to upward and downward movement of the runner 82 during travel thereof over the ground. In the position of the valve shown in FIG. 3, the follower arm 85 and the actuator 86 are in a neutral position, and the ball valve members 73 and 73a are both seated.

When a rise in the ground is encountered, the follower arm 85 and the actuator 86 pivot in a counterclockwise direction, as viewed in FIG. 3, whereby the cross bar 88 exerts pressure upon the head 93a of the shaft 76a so as to unseat the ball valve member 73a against the pressure of the spring 74a. Hydraulic fluid under pressure then flows from the pump 40 through the interconnecting conduit 51a to the fitting 69a, through the nipple 68a, the bore 67a, the port 72a, the passageways 80a and 80, the bore 67, the nipple 68, the pipe fitting 69, to the port 52 of cylinder 51, and, as a result, the piston rod 50 moves to the right, as viewed in FIG. 2. The carrier 25 (FIG. 2), including the frame member 61, is thereby raised. As the frame member 61 rises, the actuator 86 is effectively rocked in a clockwise direction on the pivot pin 87 thereby gradually allowing the shaft 76a to slide rearwardly and the ball 73a to return toward seated position under force of the spring 74a. After the carrier reaches a predetermined height, the ball member 73a seats and upward movement of the carrier stops since the valve is in its neutral position.

When the harvesting machine encounters a depression in the ground, the follower arm 85 and actuator 86 pivot by gravity in a clockwise direction, the cross bar 88 exerts pressure upon the head 93 of the push rod 76, and the ball valve member 73, therefore, is unseated against the pressure of the spring 74. Hydraulic fluid in the cylinder 51 then flows back through the conduit 68a to the pipe fitting 69, through the nipple 68, the bores 67 and 72, and drains from the drainage outlet 79 into the reservoir R via the conduit 79a. The piston rod 50 then moves to the left, as viewed in FIG. 2, allowing the carrier 25 to lower under its own weight. After the carrier lowers a predetermined distance, the valve 60 returns to its neutral position and downward movement of the carrier stops.

As is now believed understood, when the follower arm 85 and the actuator 86 return to neutral position after either a raising or a lowering of the swing frame members 18, that is when level ground is reached, the unseated ball valve member 73 or 73a is returned to seated position by its spring 74 or 74a. Thus, it will be noted that the maintenance of the carrier 25 at a correct height above the ground, in desired work position, is accomplished by the maintenance of the follower arm 85 at a predetermined angle to the horizontal. Accordingly, when the angle of the follower arm 85 to the horizontal is decreased when a ground rise is encountered, or increased when a ground depression is encountered, the raising or lowering, respectively, of the carrier, as hereinbefore described, will re-establish said predetermined angle.

The elevational control mechanism of the present invention is also significant in its control of the height of the gathering mechanism B when it is desired to move the vehicle A in reverse. For this purpose, therefore, an upwardly extending actuator arm 94 (FIG. 2) is secured to the extension 86' at the juncture thereof with the follower arm 85. The actuator arm 94 is connected to a solenoid 96 mounted on the frame member 61. The vehicle provides a gear shift lever 97 that closes a normally open switch 98 when shifted into a reverse position. This switch is in an electrical circuit with a voltage source, not shown, and with the solenoid 96 so as to energize the solenoid when this switch is closed. When the solenoid 96 is thus energized, the actuator arm 94 is raised and the actuator 86 rocks in a counterclockwise direction. The control valve 60 then operates to direct hydraulic fluid to the cylinder 51, and the entire gathering mechanism B is raised out of its work position so that the fingers 26 and the runners 82 are above the ground. When the gear shift lever 97 is later shifted into a forward position, the switch 98 automatically opens, the actuator arm 94 is released, and the control valve 60 is again placed under the control of the follower arm 85 and the runner 82.

FIG. 5 illustrates a modified form of a control mechanism for raising the gathering mechanism B when it is desired to move the vehicle A in reverse, it being noted that parts common to FIGS. 1–4 are given the same reference characters. Thus, mounted on the side element 19 of the frame 10, a short distance behind the hinge bolt 18', is a solenoid 100 connected in an electrical circuit with the switch 98. The solenoid 100 has a generally horizontal plunger 101 extending forward from the solenoid and secured to the upper end 102 of a normally vertical lever 103, the latter being pivotally mounted at its lower end 104 on the frame side element 19. A compression spring 105 encircles the plunger 101 and urges the lever 103 in a counterclockwise direction, as viewed in FIG. 5. A normally slack cable 106 has an upper end secured to the upper end 102 of the lever 103, and a lower end secured to the follower arm 85, a short distance above the ball 84'.

When the gear shift lever 97 is shifted into reverse position, the switch 98 is closed, energizing the solenoid 100; the plunger 101 is consequently moved to the right, as viewed in FIG. 5, thus pivoting the lever 103 in a clockwise direction and compressing the spring 105. Also, the follower arm 85 is raised by the cable 106, thus causing the nut gathering mechanism B to be elevated in the manner hereinbefore described. When the gear shift lever 97 is later shifted into a forward position, the switch 98 is opned, the spring 105 returns the lever 103 and cable 106 to their normal positions, and the valve 60 is again placed under the control of the follower arm 85.

An additional feature of the invention, relating to the operation of the actuator 86, is illustrated in FIGS. 5 and 6 but may be used with the form of FIGS. 1 to 4. Thus, upper and lower tension springs 107 and 108 are secured at their inner ends to opposite sides of the actuator 86, respectively, and at their outer ends to the frame member 61 and to a rearwardly extending bar 110 mounted at the lower end of the flange 91. The springs 107 and 108 tend to maintain the actuator 86 in the neutral position. The force exerted by the springs 107 and 108, however, is not sufficient to preclude the above described operation of the follower arm 85 and the actuator 86. Instead, the springs 107 and 108 yieldably resist rocking of the actuator 86 and thus prevent excessive working of the valve 60, such as might otherwise be produced by minor irregularities under the runner 82.

From the foregoing, it will be evident that the elevational control mechanism of the present invention maintains the carrier for the gathering fingers, or other implements or tools, in desired work position in predetermined spaced relation to the ground over which the machine travels notwithstanding the existence of irregularities in the contour of the land. In addition, the subject control mechanism responds to significant changes in the contour of the terrain rather than to minor irregularities or obstructions. Of further important, the control mechanism automatically raises the carrier and the fingers or tools mounted thereon out of work position when the machine moves in reverse.

Although preferred embodiments of the present invention have been shown and described, it is to be understood that various changes and modifications may be made in the details thereof without departing from the spirit and the scope of the appended claims.

Having thus described my invention, that which is claimed as new and desired to be protected by Letters Patent is:

1. In a vehicle, a support mounted for both forward and rearward earth traversing movement along a predetermined path, an implement carrier, means mounting said carrier on the support for elevationally adjustable movement, fluid control means mounted on said support and connected to said carrier for raising and lowering said carrier and including a power cylinder connected to said carrier, a valve arranged when actuated to control flow of fluid to said cylinder, ground engaging means connected to said carrier for sensing the changes in the contour of terrain traversed during forward movement of said support, means operably interconnecting said ground engaging means and said valve for actuating said valve to energize said cylinder and thus raise and lower said carrier in response to rise and fall of said ground engaging means during said forward movement, and means on said support for effecting rearward movement thereof and being operably associated with said interconnecting means for raising said ground engaging means and thus said carrier during rearward movement of said support.

2. In a vehicle, a support mounted for forward and rearward earth traversing movement along a predetermined path, an implement carrier, means mounting said carrier on said support for elevationally adjustable movement, a horizontal pivot member mounted on said carrier in transverse relation to said path, fluid control means mounted on said support and connected to said carrier for raising and lowering said carrier and including a fluid operated power cylinder, and a valve mounted on said carrier forward of said pivot member and arranged when actuated to direct fluid to said cylinder, said valve including slidable upper and lower shafts above and below said pivot member and substantially normal thereto, alternate forward sliding movement of said upper and lower shafts being adapted to operate said valve and energize said power cylinder to raise and lower said carrier, elevation sensing means including a lower ground engaging portion adapted to rise and fall during forward movement of said support over uneven terrain and an upper portion pivoted on said pivot member and being rockable on said member in response to rise and fall of said lower portion for alternately sliding said upper and lower shafts forwardly thereby to raise and lower said carrier, and means on said support operably connected to said sensing means and being responsive to rearward movement of said support for raising said lower portion of said sensing means and rocking said upper portion thereof to raise said carrier.

3. In a support mounted for forward and rearward earth traversing movement along a predetermined path, an implement carrier, means mounting said carrier on said support for elevationally adjustable movement, a horizontal pivot member mounted on said carrier in transverse relation to said path, fluid control means mounted on said support and connected to said carrier for raising and lowering said carrier and including a fluid operated power cylinder, and a valve mounted on said carrier forward of said pivot member, said valve being arranged when operated to direct fluid to said power cylinder and including slidable upper and lower shafts above and below said pivot member and disposed in a plane substantially normal thereto whereby alternate forward sliding movement of said upper and lower shafts is adapted to operate said valve and energize said cylinder to respectively to raise and lower said carrier, elevation sensing means including a lower ground engaging portion adapted to rise and fall during forward movement of said support over uneven terrain and an upper portion pivoted on said pivot member and being rockable on said member in response to rise and fall of said lower portion for alternately sliding said upper and lower shafts forwardly thereby to raise and lower said carrier, a solenoid mounted on said carrier, means interconnecting said solenoid and said sensing means for raising said lower portion thereof and rocking said upper portion in response to energization of said solenoid, a control member mounted on said support having a reverse position in which it is adapted to effect movement of said support rearwardly along said path, and means connecting said solenoid in an electrical circuit with a switch mounted on said support adjacent to said control member, said switch having a closed position in which the solenoid is energized, and said switch being moved to closed position upon movement of said control member into its reverse position.

4. In a support mounted for forward and rearward earth traversing movement along a predetermined path, an implement carrier, means mounting said carrier on said support for elevationally adjustable movement, a horizontal pivot member mounted on said carrier in transverse relation to said path, fluid control means mounted on said support and connected to said carrier for raising and lowering said carrier and including a fluid operated power cylinder, and a valve mounted on said carrier forward of said pivot member, said valve being arranged when operated to direct fluid to said power cylinder and including slidable upper and lower shafts above and below said pivot member and disposed in a plane substantially normal thereto whereby alternate forward sliding movement of said upper and lower shafts operates said valve and energizes said cylinder to respectively to raise and lower said carrier, elevation sensing means including a lower ground engaging portion adapted to rise and fall during forward movement of said support over uneven terrain and an upper portion pivoted on said pivot member and being rockable on said member in response to rise and fall of said lower portion for alternately sliding said upper and lower shafts forwardly thereby to raise and lower said carrier, a solenoid mounted on said support, a flexible tension member interconnecting said solenoid and said sensing means having a normally slack condition but being placed under tension upon energization of said solenoid to raise said lower portion of the sensing means and to rock said upper portion to raise said carrier, a control member mounted on said support having a reverse position in which it is adapted to effect movement of said support rearwardly along said path, and means connecting said solenoid in an electrical circuit with a switch mounted on said support adjacent to said control member, said switch having a closed position in which said solenoid is energized, and said switch being moved to closed position upon movement of said control member into its reversing position.

References Cited by the Examiner
UNITED STATES PATENTS

| | | | |
|---|---|---|---|
| 534,403 | 2/95 | Mechwart | 172—4 |
| 534,426 | 2/95 | Cooper | 172—4 |
| 1,457,647 | 6/23 | Avera | 172—2 |
| 2,295,519 | 9/42 | Millikin et al. | |
| 2,750,727 | 6/56 | Wright | 56—208 |
| 2,842,925 | 7/58 | Allen | 56—208 |
| 2,972,847 | 2/61 | Matthews | 56—11 |
| 3,088,264 | 5/63 | Sallee | 172—4 X |

FOREIGN PATENTS 821,225  10/59  Great Britain.

ABRAHAM G. STONE, *Primary Examiner.*

A. JOSEPH GOLDBERG, *Examiner.*